United States Patent
Schiessl et al.

(10) Patent No.: US 9,710,232 B2
(45) Date of Patent: Jul. 18, 2017

(54) COMPUTER-AIDED METHOD FOR PRODUCING A SOFTWARE-BASED ANALYSIS MODULE

(76) Inventors: Michael Schiessl, Berlin (DE); Sabrina Duda, Berlin (DE); Andreas Thoelke, Berlin (DE)

( * ) Notice: Subject to any disclaimer, the term of this patent is extended or adjusted under 35 U.S.C. 154(b) by 718 days.

(21) Appl. No.: 13/642,567

(22) PCT Filed: Apr. 20, 2011

(86) PCT No.: PCT/DE2011/075084
§ 371 (c)(1),
(2), (4) Date: May 31, 2013

(87) PCT Pub. No.: WO2011/131186
PCT Pub. Date: Oct. 27, 2011

(65) Prior Publication Data
US 2013/0263079 A1    Oct. 3, 2013

(30) Foreign Application Priority Data

Apr. 20, 2010 (DE) .................. 10 2010 016 541

(51) Int. Cl.
*G06F 9/44* (2006.01)
*G06Q 30/02* (2012.01)
(52) U.S. Cl.
CPC ............... *G06F 8/20* (2013.01); *G06Q 30/02* (2013.01)
(58) Field of Classification Search
None
See application file for complete search history.

(56) References Cited

U.S. PATENT DOCUMENTS 6,850,956 B1 * 2/2005 Knutson ............... G06F 8/34
7,926,024 B2 * 4/2011 Clarke ............... G06Q 10/06
703/21

(Continued)

OTHER PUBLICATIONS

Stensrud et al. Human performance estimating with analogy and regression models: an empirical validation.Proceedings Fifth International Software Metrics Symposium, 1998, pp. 205-213. Retrieved on [Apr. 25, 2017] Retrieved from the Internet: URL<http://ieeexplore.ieee.org/document/731247/>.*

(Continued)

*Primary Examiner* — Thuy Dao
*Assistant Examiner* — Cheneca Smith
(74) *Attorney, Agent, or Firm* — Dinsmore & Shohl LLP

(57) ABSTRACT

The invention relates to a computer-assisted method for generating a software-based analysis module for analysis of electronic raw data representing a detected stimulus response of a test subject in a test project. The method comprises the following steps: supplying logic data representing a user-defined calculation logic in an application software implemented on a computer unit, supplying project data representing a user-defined project definition with a structured order of project entities of the test project in the application software, generating product setup parameter data by assigning the user-defined calculation logic to the project entities in the assignment of the logic data to the project data, and the project setup parameters for the project entities of the test project are derived therefrom, the project setup parameter data for a data output are supplied via a user interface and the assigned user entries are detected for a portion of the project setup parameter data, and an analysis module is generated in accordance with the logic data, the project data and the project setup parameter data, which are configured to receive electronic raw data representing a (Continued)

Figure 1:
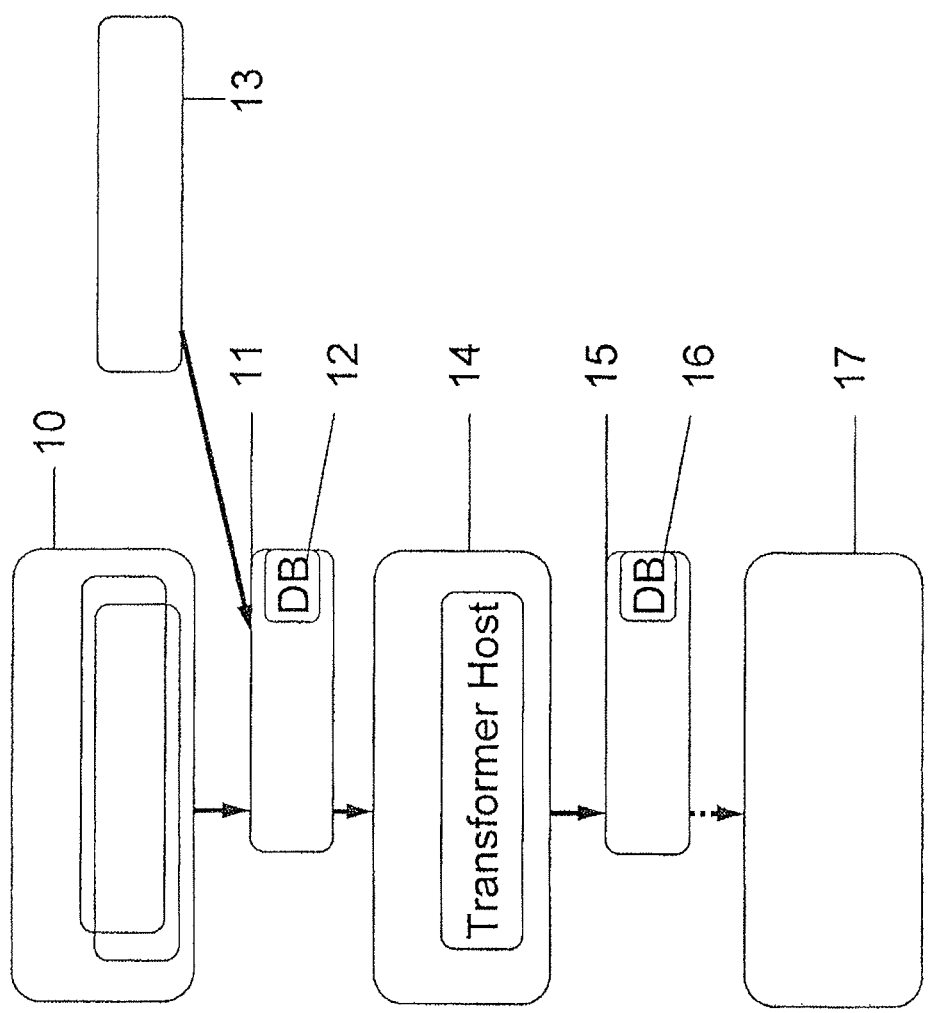

detected stimulus response of a test subject and to process said electronic raw data for analyzing the response of the test subject.

13 Claims, 16 Drawing Sheets

(56) References Cited

U.S. PATENT DOCUMENTS

| | | | | |
|---|---|---|---|---|
| 7,930,199 | B1* | 4/2011 | Hill | G06F 17/30259 |
| | | | | 382/118 |
| 7,971,181 | B2* | 6/2011 | Pabalate et al. | 717/104 |
| 8,359,566 | B2* | 1/2013 | Chaar et al. | 717/101 |
| 2002/0143602 | A1* | 10/2002 | Chappel | G06Q 10/0639 |
| | | | | 705/7.38 |
| 2005/0114830 | A1* | 5/2005 | Knutson | G06F 8/10 |
| | | | | 717/102 |
| 2006/0179418 | A1* | 8/2006 | Boyd | G06F 17/30017 |
| | | | | 717/100 |
| 2008/0016490 | A1* | 1/2008 | Pabalate et al. | 717/101 |
| 2008/0256516 | A1* | 10/2008 | Chaar et al. | 717/121 |
| 2010/0169792 | A1* | 7/2010 | Ascar | G06F 11/3414 |
| | | | | 715/744 |
| 2010/0299182 | A1* | 11/2010 | Eivaz | G06F 3/011 |
| | | | | 705/7.32 |

OTHER PUBLICATIONS

Ramloll, Rameshsharma, et al. "Gaze data visualization tools: opportunities and challenges." Information Visualisation, 2004. IV 2004. Proceedings. Eighth International Conference on. IEEE, 2004. Retrieved on [Apr. 25, 2017] Retrieved from the Internet: URL<http://ieeexplore.ieee.org/abstract/document/1320141/>.*
International Preliminary Report, Application PCT/DE2011/075084 filed Apr. 20, 2011.

* cited by examiner

| EventData | | | | | | | | |
|---|---|---|---|---|---|---|---|---|
| Gaze Type: TimeLocationEvent | SubjectID | TaskID | ScreenID | Time | Location | | | |
| | 5 | 1 | Homepage | 100 | 34,56 | | | |
| | 5 | 1 | Homepage | 112 | 24,52 | | | |
| | 5 | 1 | Homepage | 243 | 22,65 | | | |
| GazeArea Contact Type: Area Contact | SubjectID | TaskID | ScreenID | Time | Location | Stimulus Element | | |
| | 5 | 1 | Homepage | 100 | 34,56 | Logo | | |
| | 5 | 1 | Homepage | 112 | 24,52 | Logo | | |
| | 5 | 1 | Homepage | 243 | 22,65 | Key Visual | | |
| Event Collect | | | | | | | | |
| Visit Type: AreaVisit | SubjectID | TaskID | ScreenID | Time | Location | Stimulus Element | Start Time | End Time | Duration |
| | 5 | 1 | Homepage | | | Logo | 100 | 112 | 12 |
| | 5 | 1 | Homepage | | | Key Visual | 243 | | |

Fig. 11

| SubjectStimulusAggregate | | | | | | | | | |
|---|---|---|---|---|---|---|---|---|---|
| | Subject Event | Task Event | Screen Event | | | | | | |
| | | | | | Event Sum | | Attribute Sum | Attribute Case (Simple/Combined) | |
| | | | | | VisitCount, Fixation | | Attendance Time | Perception Level | |
| Type: Todo | Subject ID | TaskID | ScreenID | AreaID | Visit Count [Cnt] | Event Condition Revisit [BI] | Attendance Time | Perception Level [Enum] | |
| | 5 | 1 | Home page | Logo | 2 | 1 | 12 | Superficial | |
| | 5 | 1 | Home page | Key Visual | 0 | 0 | 200 | Involved | |
| | 6 | 1 | Home page | Logo | 4 | 1 | 0 | None | |
| | 6 | 1 | Home page | Key Visual | 1 | 0 | 20 | Superficial | |
| StimulusAggregate (Aggregate over subjects) | | | | | | | | | |
| | | | | | Event Average | Event Condition | Attribute Average | Attribute Case | AttributeCase Share |
| | | | | | VisitCount, Fixation | Revisit, Perceived | Attendance Time | Perception Level | PerceptionLevel, VisitLevel |
| | | TaskID | ScreenID | AreaID | VisitCount [Av] | Revisit [%] | Attendance Time | Perception Level | Perception Level | Medium [%] |
| | | 1 | Home page | Logo | 3 | 100 | 6 | 50 | 0 | |
| | | 1 | Home page | Key Visual | 0,5 | 0 | 110 | 50 | 0 | |

Fig. 12

For Items only

Content (Item)

Text

Image

Shape

IsMandatory

MandatoryMessage

DataErrorMessage

ResultData (Item)

ContentValue

For Groups

Basic (Group)

Type (GroupType)

Children (NodeCollection)

IsRandom

EventLogic

For Groups and Items

Basic (All)

ID (String)

Description (String)

TagCollection (StringCollection)

Path (StringCollection)

Parent (Node)

Repository Path (StringCollection)

ResultData (All)

AttendanceTime (Timespan)

VisitCount (int)

HasRevisits (bool)

LevelOfPerception (Enum)

FixationCount (int)

InteractionCount (int)

Presenter (All)

IsActive (bool)

LocParent (Point)

LocScreen (Point)

Timer (Timespan)

URL (String)

Fig. 15

COMPUTER-AIDED METHOD FOR PRODUCING A SOFTWARE-BASED ANALYSIS MODULE

The invention relates to a computer-assisted method for generating a software-based analysis module for analyzing electronic raw data representing a detected stimulus response of a test subject in a test project.

BACKGROUND OF THE INVENTION

Such software-based analysis modules are used to analyze electronic raw data previously detected as part of a test project. The raw data represent the stimulus response of a test subject in the specific test environment being used. Such test projects are used in conjunction with market research where it is one of the most important tools of marketing. However market research provides decision-making aids not only for marketing but also for other corporate areas such as controlling and distribution.

Software-based technologies are used to efficiently, comprehensively and cost-effectively conduct the test projects of market research. Typical research tasks include, for example, researching the quality of a product, the efficacy of advertising, the efficiency of the distribution or the structure of a selling price. For example, a typical test project relates to the behavior of a test subject in a sales environment ("point of sale"). Questions of optimal placement of a product for sale or the effect of advertising programs on sale of a product arise here. Other test projects relate to researching the effects and improving advertising spots on television or advertising on the Internet. As part of the respective test project, the test subject is exposed to the individual stimulus elements, for example, a specific product presentation in a sales environment or the advertising spot, forming the so-called stimulus of the test project. The behavior of the test subject is determined on this basis and is used to derive electronic raw data. While data are detected by so-called "eye tracking," for example, which serves to detect the viewing direction of the test subject's eyes with respect to individual or multiple stimulus elements. In addition or alternatively, raw data from user entries made by the test subject on a keyboard of a computer may also be detected in conjunction with the test project to determine the effect of an advertising spot.

The actual execution of the text project must be preceded by planning and a definition of the elements of the test project in which the test environment and the stimulus elements are defined on the basis of the question(s). After the test project has been conducted in accordance with the given definition and the raw data representing the stimulus response of the test subject have been detected, the raw data are analyzed to obtain information with respect to the questions to be processed in the context of the test project. The data thereby derived from the raw data are referred to as so-called metrics data. The result of the analysis of the electronic raw data is then made available for a presentation.

In known test projects, applications are used to support individual elements of the process through the software technology.

SUMMARY OF THE INVENTION

The object of the invention is to provide a computer-assisted method for generating a software-based analysis module for analysis of electronic raw data representing a detected stimulus response of a test subject in a test project with which a simple and efficient individual adjustment for automated analysis of the raw data is made possible.

This object is achieved according to the invention by a computer-assisted method for generating a software-based analysis module for analysis of electronic raw data according to the Independent claim 1. Advantageous embodiments of the invention are the subject matter of dependent claims.

The invention comprises the idea of a computer-assisted method for generating a software-based analysis module for analysis of electronic raw data representing a detected stimulus response of a test subject in a test project, wherein the method comprises the following steps which are executed in a computer unit:

supplying logic data representing a user-defined calculation logic in an application software implemented on the computer unit, supplying project data representing a user-defined project definition with a structured order of project entities of the test project in the application software, generating project setup parameter data by assigning the user-defined calculation logic to the project entities in assigning the logic data to the project data and deriving therefrom project setup parameters for the project entities of the test project, supplying the project setup parameter data for a data output via a user interface and detecting assigned user entries for at least some of the project setup parameter data, and generating an analysis module according to the logic data, the project data and the project setup parameter data, said module being configured to receive electronic raw data representing a detected stimulus response of a test subject in a test project and to process said data for analyzing the response of the test subject.

This method permits on the one hand a user-defined individual adjustment of the test project for detecting the stimulus response by supplying logic data and project data in a user-defined manner. To do so, the project data is supplied separately from the logic data, which permits an individual configurability and separate handling, processing and administration. A calculation logic for the specific test project is defined with the logic data. The user can preferably access predefined transformation modules or logic modules in his user-defined definition of the calculation logic. The project data represent a user-defined project definition with a structured arrangement of project entities of the test project in which all the elements involved in the project definition are combined in a hierarchical arrangement. Then project setup parameter data representing project setup parameters for the project entities of the test project are generated from the assignment of the logic data and the project data. The user then receives an opportunity to adjust the project setup parameter data individually. Finally, against this background the analysis module is generated and is used for analysis of electronic raw data after said data have been detected as part of the test project. The analysis module is preferably used by means of a so-called Transformer Host Application.

The creation or supply of the analysis module also involves creating the module on the basis of an existing analysis module in accordance with the logic data, the project data and the project setup parameter data in an adapted form for the specific project. There is an adjusted supply of the analysis module for the project defined by the logic data, the project data and the project setup parameter data.

The present invention makes available a technology which makes is possible to automatically generate an assigned analysis module for any test projects for utilizing the raw data detected within the framework of the test project for the stimulation response of a test subject. The separate operation of providing logic data on the one hand and project data on the other hand, which are provided according to the invention, supports the greatest possible flexibility in generating the project-specific analysis module.

A preferred embodiment of the invention provides that the logic data and/or the project data of a graphic representation is/are applied accordingly. In this embodiment, predefined modules are supplied to the user in a graphic layout and the user input is connected in a graphic representation accordingly and is made available.

Another preferred embodiment of the invention provides that the step for generating the analysis module comprises converting the logic data into source text data and supplying the project setup parameters with the assigned project setup parameter values. The project setup parameter data thus ultimately comprise defined setting parameters on the one hand and assigned values for the setting parameters on the other hand.

According to another preferred embodiment of the invention, the logic data, the project data and/or the project setup parameter data are supplied in an XML-based data format.

In a preferred embodiment of the invention it is provided that the step of generating project setup parameter data includes deriving setting parameter data from the logic data by analyzing the logic data according to parameters comprised by them and assigning the setting parameter data to the project entities of the test project in the project data. In one embodiment, the derivation of setting parameter data leads to a so-called parameter list, which is then applied to the project data, which leads to assigning the setting parameter data from the parameter list to the project entities of the test project.

According to another preferred embodiment of the invention, the logic data are first supplied as editable output logic data and user entries based on these data, with which the output logic data are edited or detected using an assigned editor. With the help of the assigned editor, the user is given an opportunity to develop project-specific definitions of the logic data in a simple and efficient manner. It is provided here that first output logic data, which may optionally already represent a cohesive calculation logic which the user can then accept either entirely or partially, are presented first to the user.

In addition, according to a preferred embodiment of the invention, predefined calculation logic modules that can be selected by the user are supplied with the editor which is assigned to the logic data.

According to another preferred embodiment of the invention, the project data are first supplied as editable output project data and user input based thereon with which the project data are edited can be detected by means of an assigned editor. The editor assigned to the project data is preferably formed and implemented separately from the editor for the logic data. Independently of whether the editors are separated completely from one another or only partially, the detection of the logic data is performed separately from the project data.

According to another preferred embodiment of the invention, the editor which is assigned to the project data is supplied with one or more subeditors comprising the following subeditors:

a tree editor, which is configured to display a hierarchical structure of the structured organization of the project entities and to detect user input data based thereon, a node editor, which is configured to display property parameters of a currently selected node of the structured order of the project entities and to detect user input data based thereon, and a canvas editor, which is configured to display a spatial arrangement of nodes of the structured order of the project entities and to detect user entries based thereon.

According to another preferred embodiment of the invention, the project setup parameter data for project setup parameters thereby represented comprise metadata which include at least one type of data selected from the following group of types of data:

value range recommendation data,
value range restriction data,
commentary data,
priority data,
control type data,
grouping, filtering and/or sorting data and
reference data for referring to auxiliary functions.

According to another preferred embodiment of the invention, the analysis module is configured to generate metrics data representing the response of the test subject in processing the raw data. Metrics data or data derived from the raw data and have a direct relevance for a user, for example, a decision-maker in market research, with respect to the performance/quality of a product property (stimulus element). One example of a metrics value is the duration of observation of the product packaging as a stimulus element. In one embodiment, the metrics data are formed using the following information comprehensively: data about one or more test subjects, data about the questions processed and data about the properties of the stimulus elements investigated in communication with the test subject(s).

DESCRIPTION OF PREFERRED EXEMPLARY EMBODIMENTS

Figure 2:
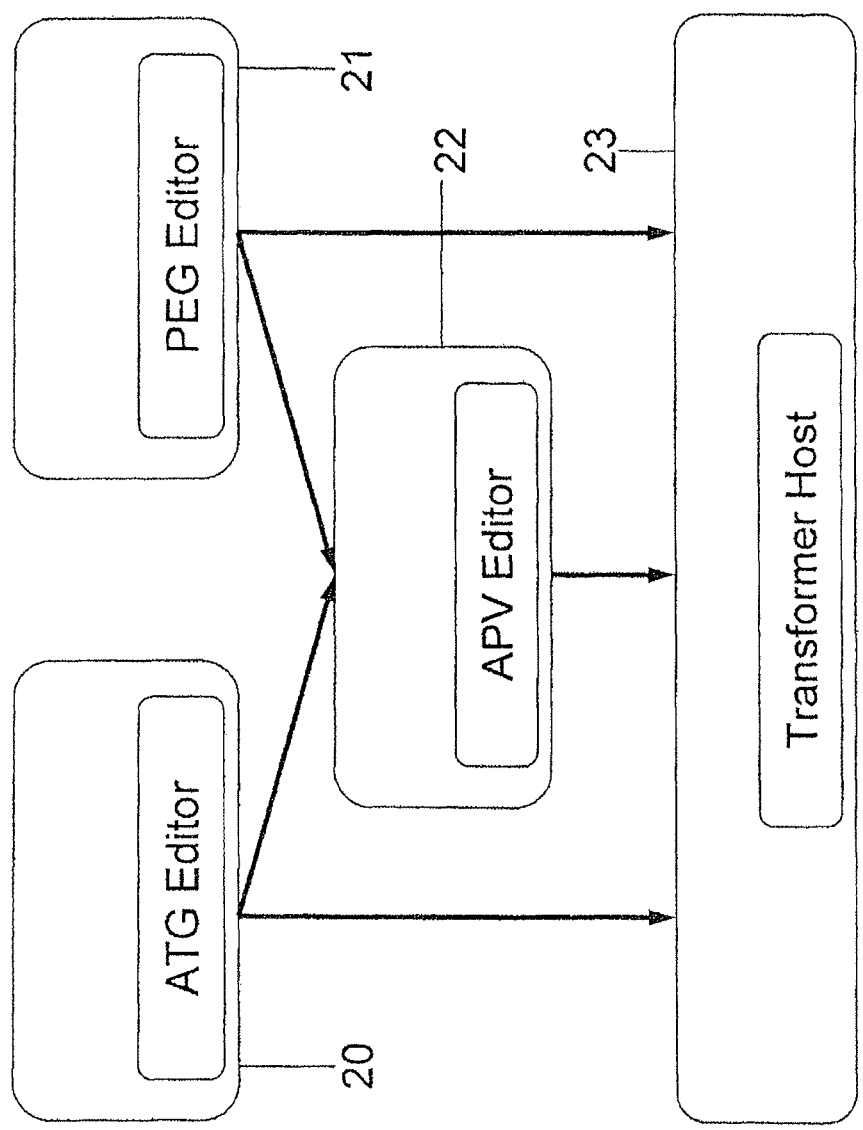
Figure 3:
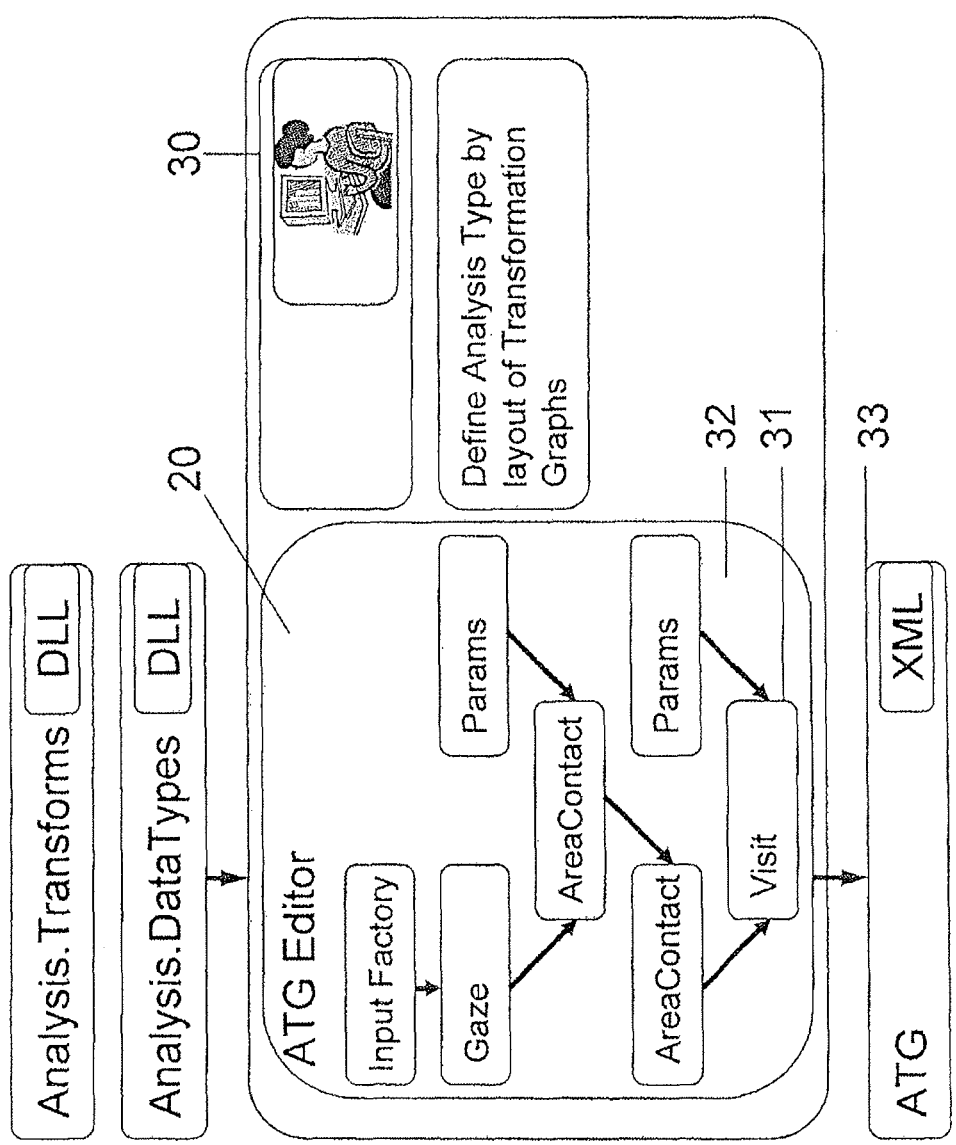
Figure 4:
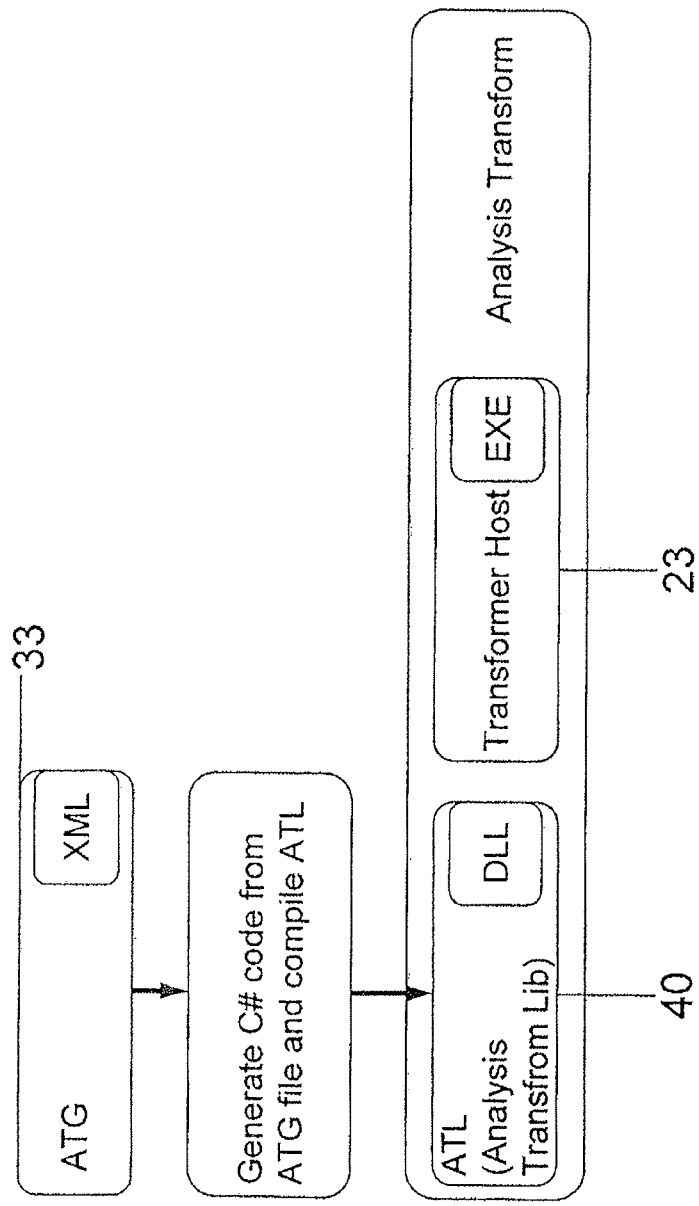
Figure 5:
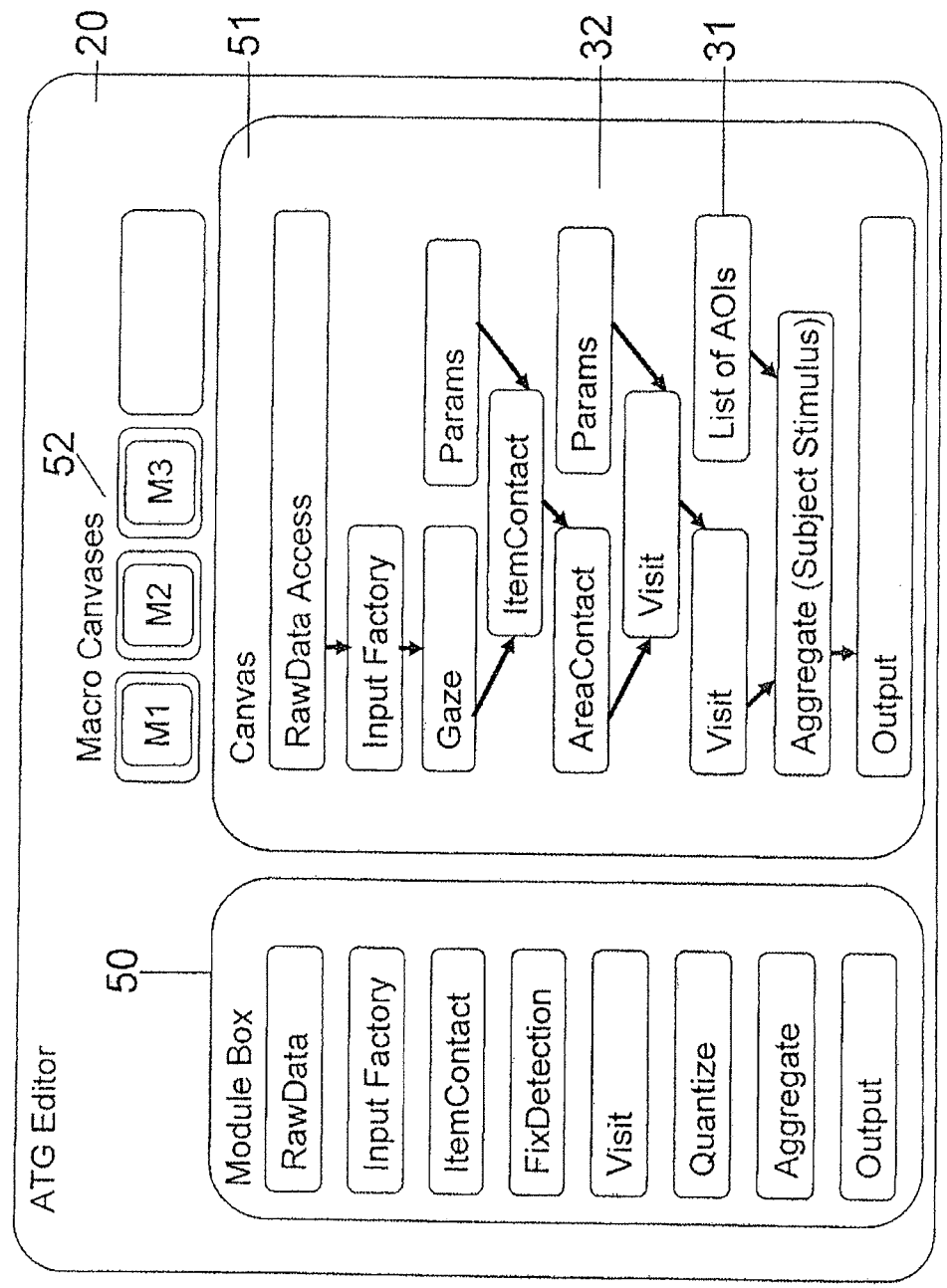
Figure 6:
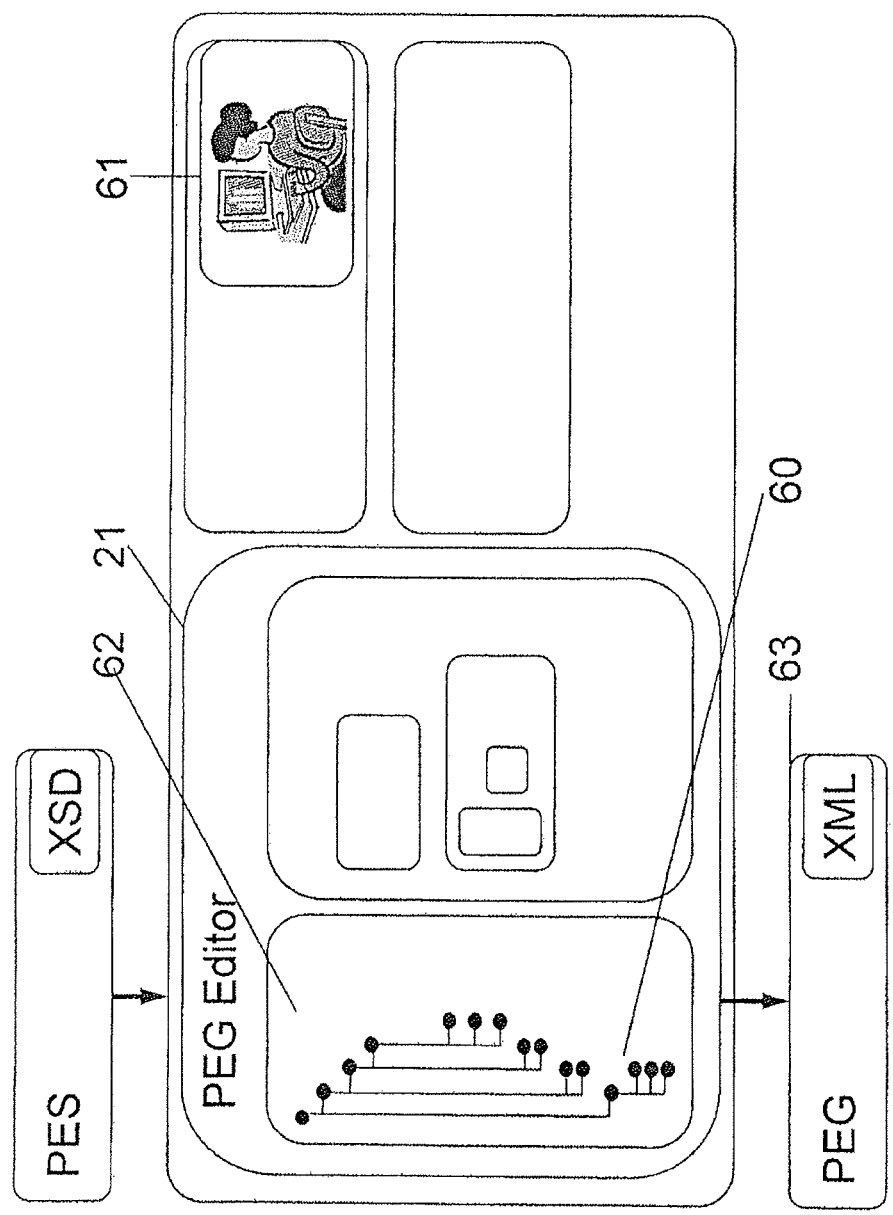
Figure 7:
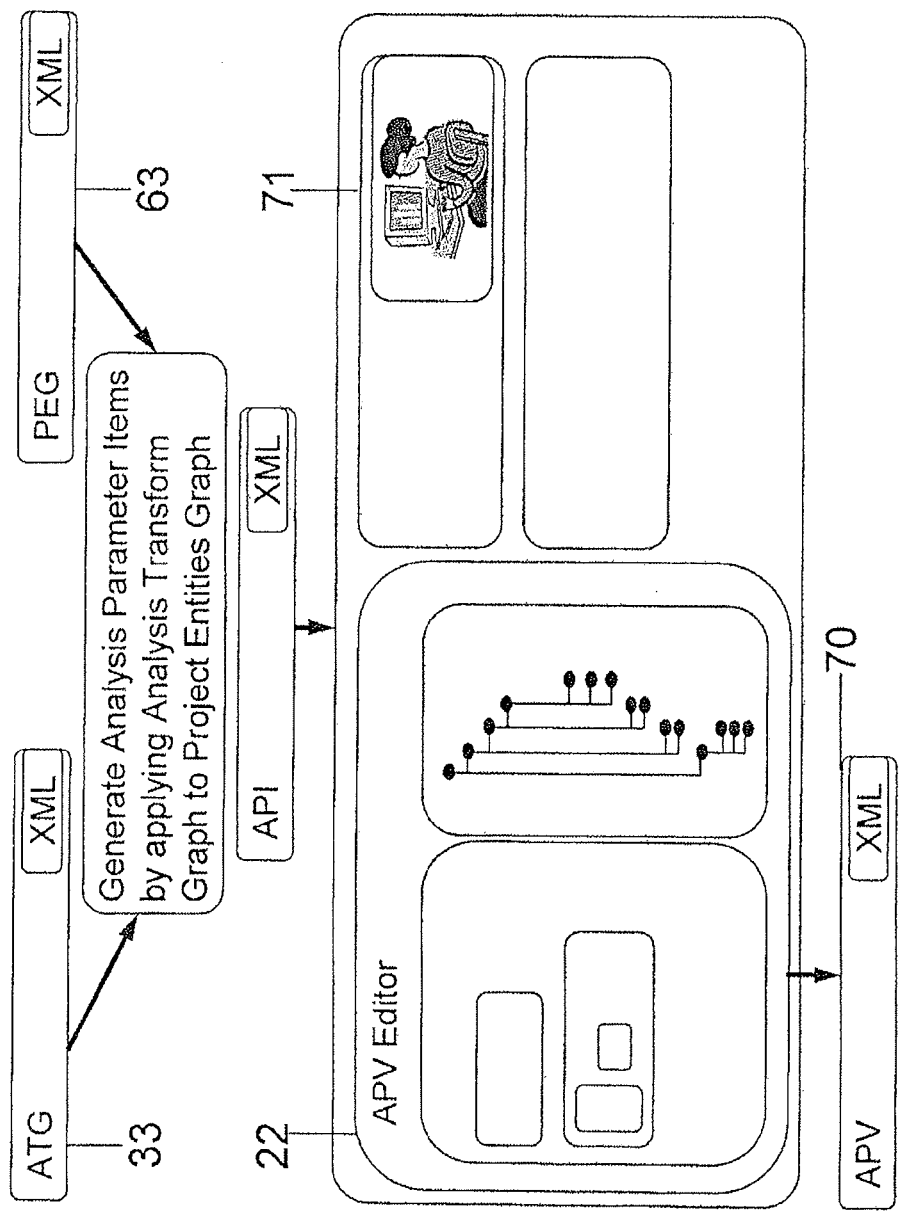
Figure 8:
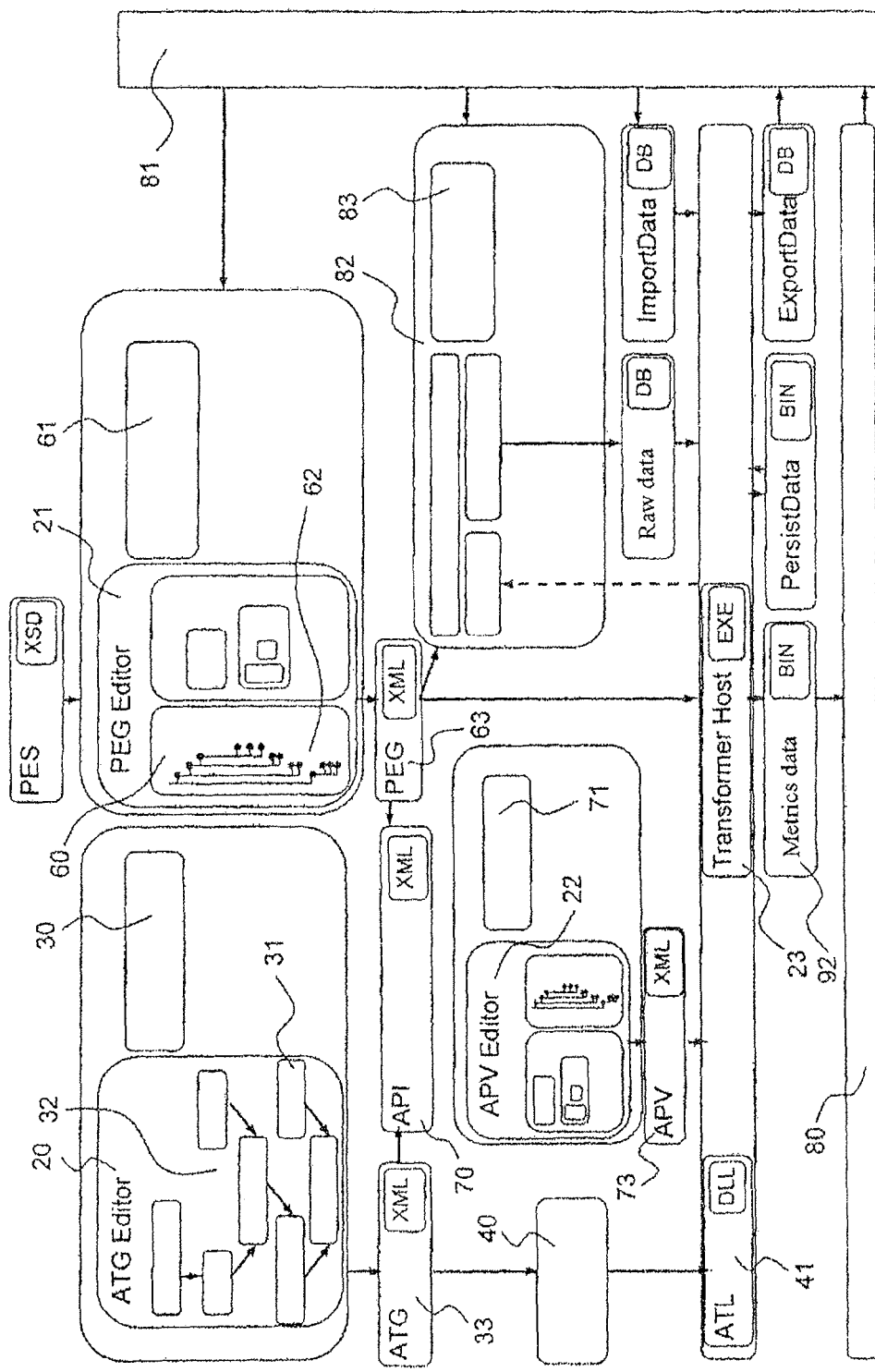
Figure 9:
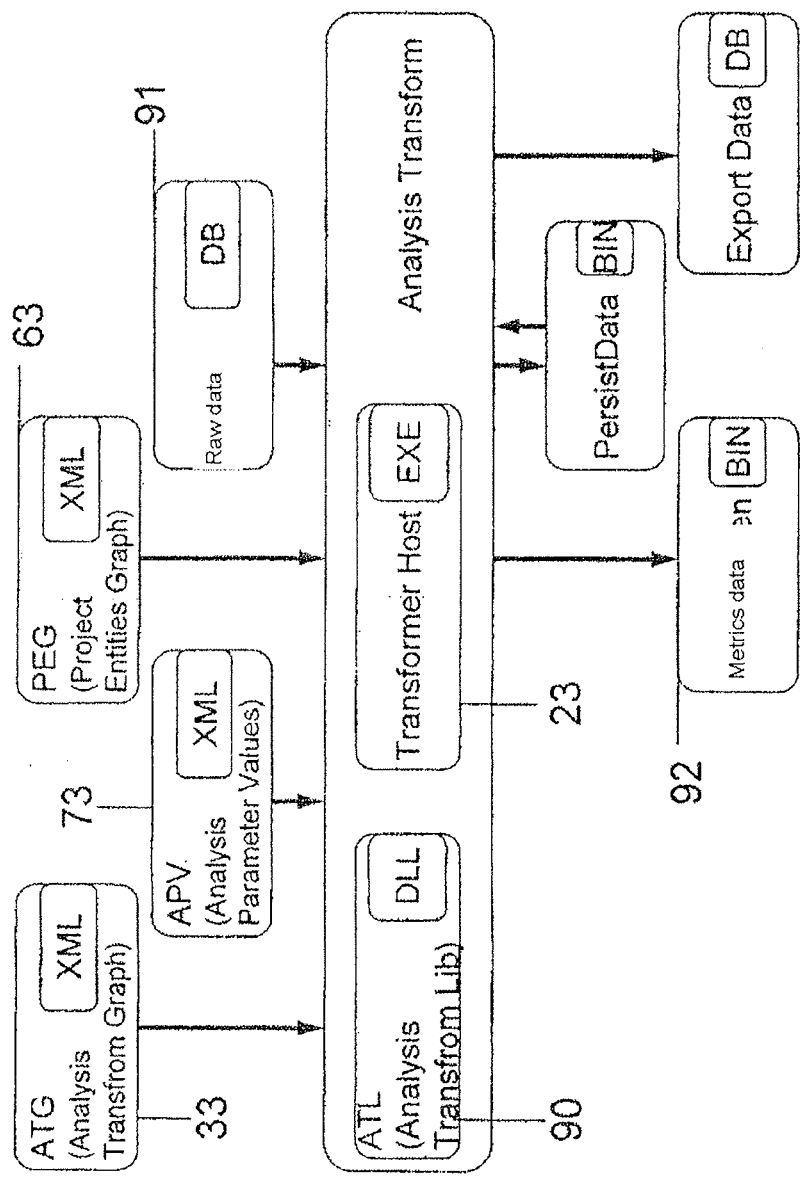
Figure 10:
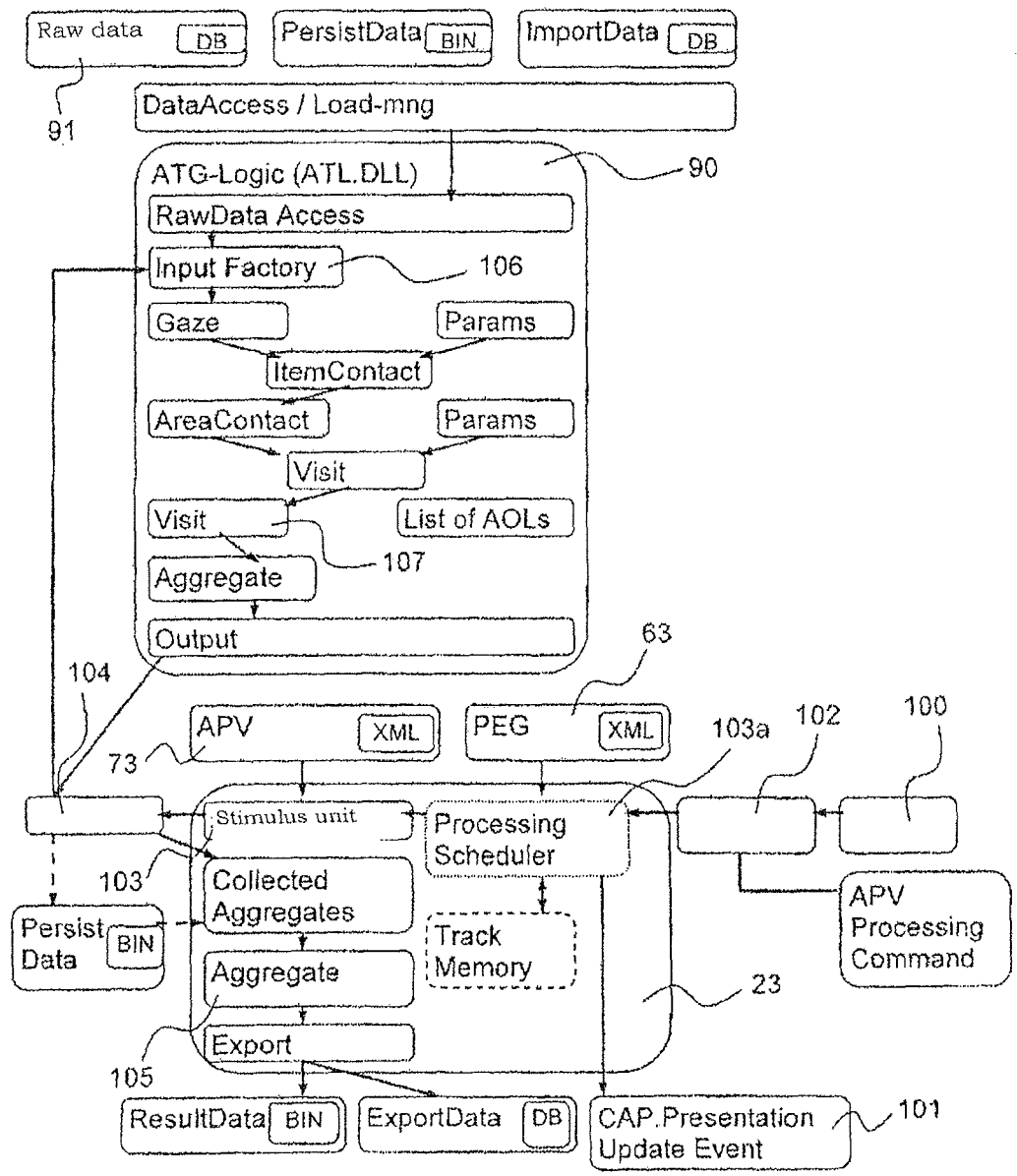
Figure 13:
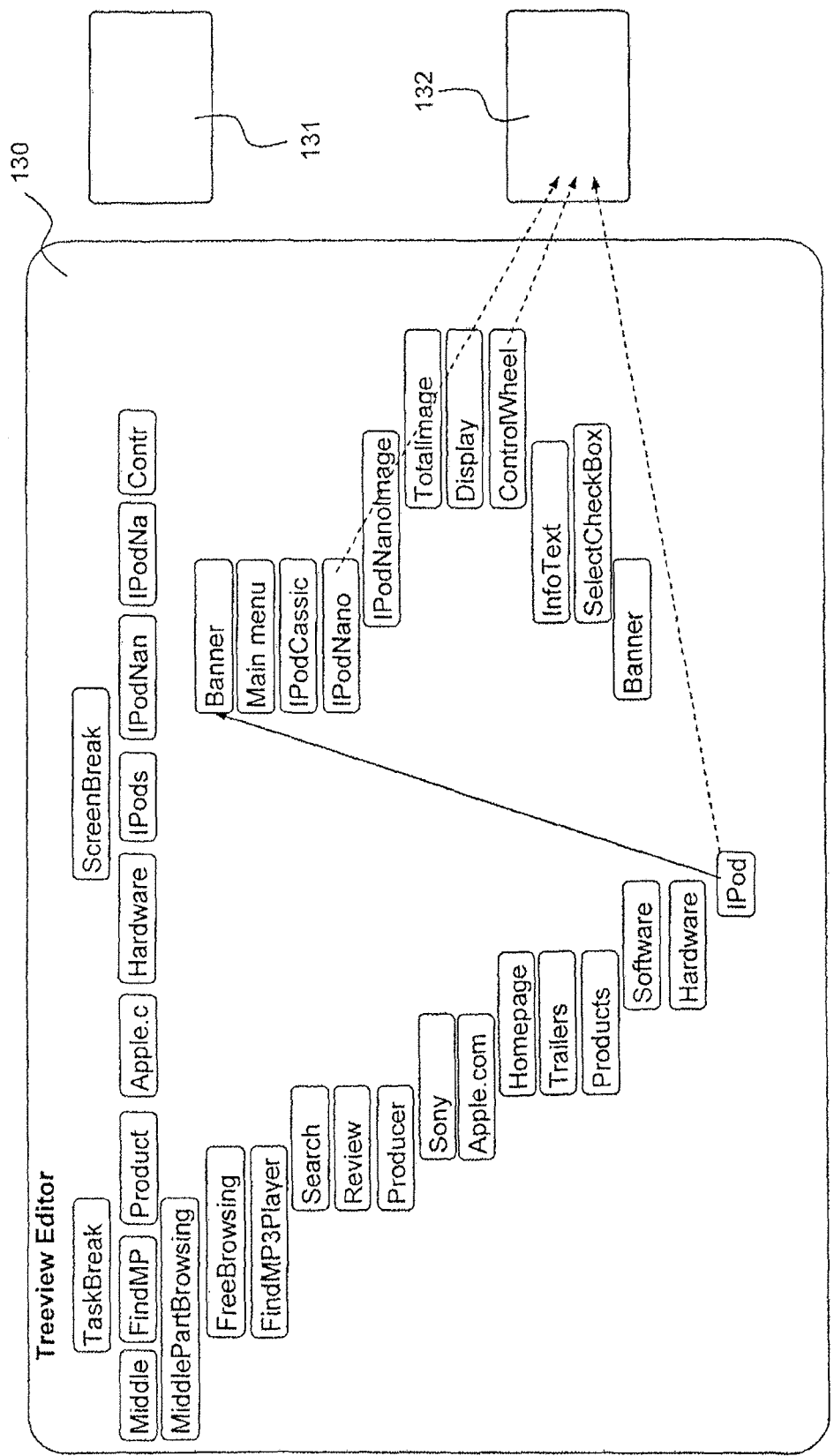
Figure 14:
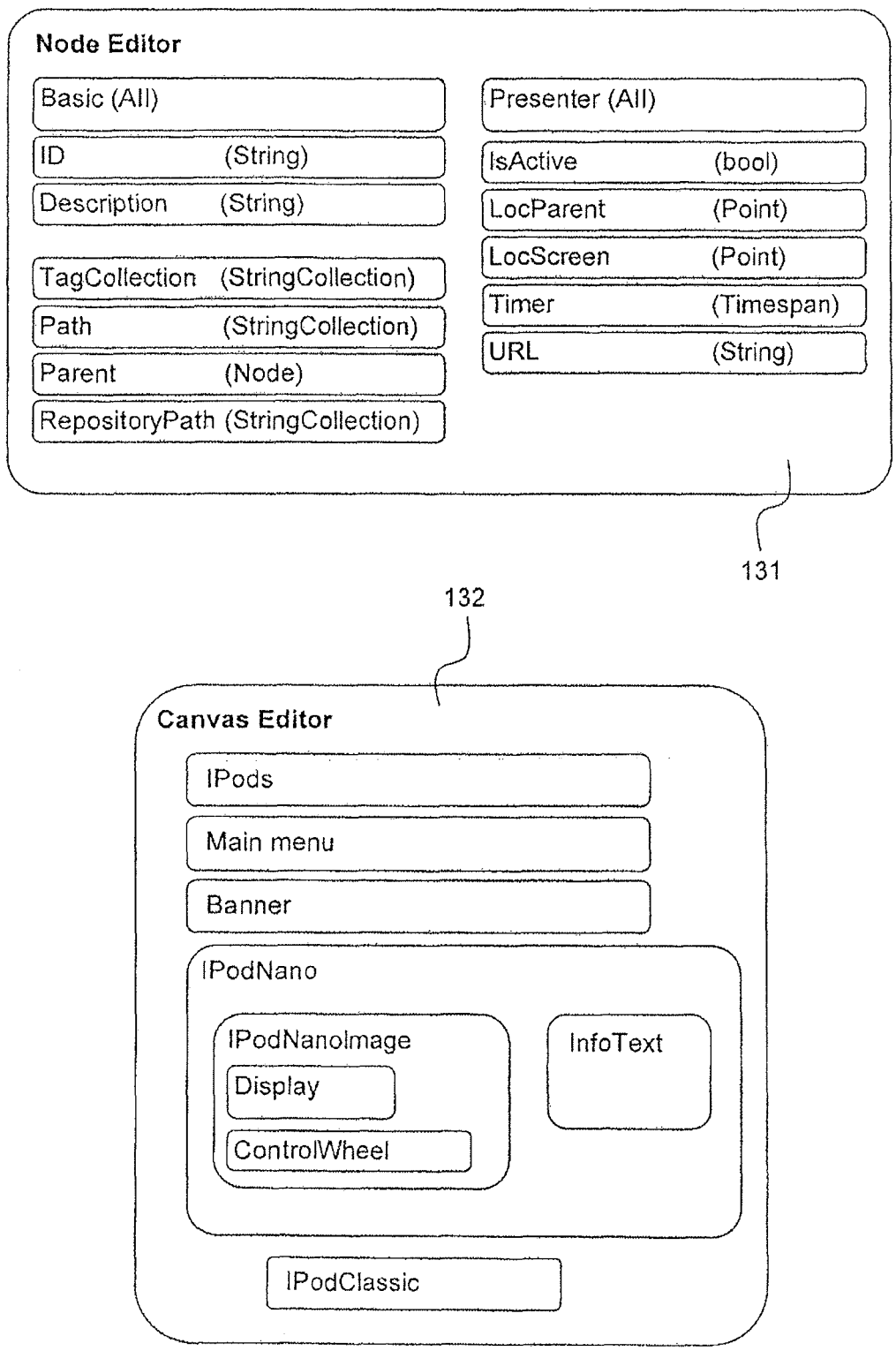
Figure 16:
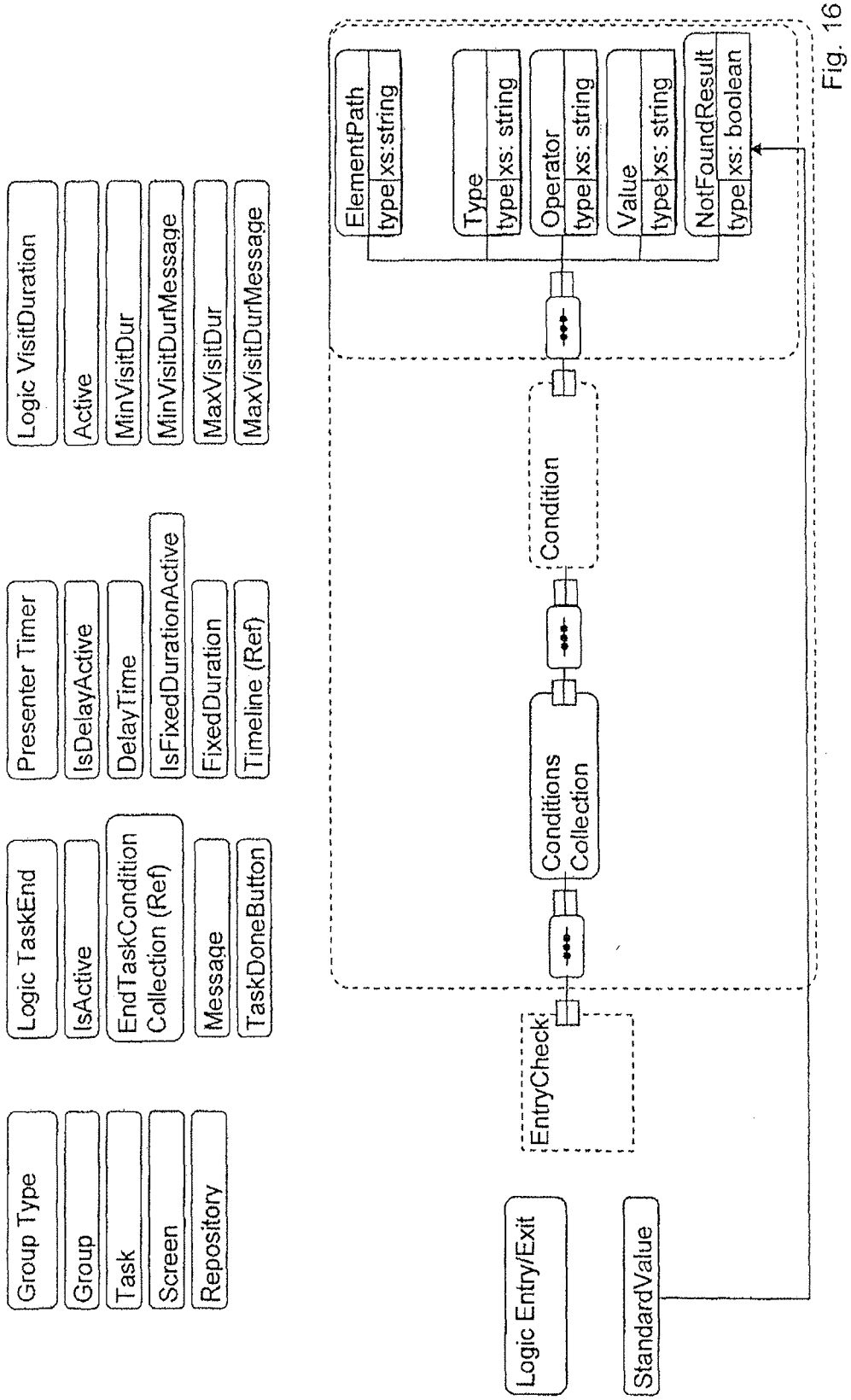

The present invention is explained in greater below on the basis of preferred exemplary embodiments with reference to the figures of a drawing, in which:

FIG. 1 shows a schematic block diagram in combination with a computer-assisted method for generating a software-based analysis module for analysis of electronic raw data representing a stimulus response of a test subject in a test project in market research, FIG. 2 shows a schematic block diagram of a software-based analysis module, FIG. 3 shows a schematic block diagram of additional details in combination with an ATG editor, FIG. 4 shows a schematic diagram for implementation and use of an ATG model, FIG. 5 shows another schematic block diagram of the ATG editor, FIG. 6 shows a schematic block diagram of additional details in combination with a PEG editor, FIG. 7 shows a schematic block diagram in combination with an APV editor, where the ATG editor and the PEG editor are also shown, FIG. 8 shows a schematic block diagram of distributed hosting, FIG. 9 shows a schematic diagram of the use of a Transformer Host Application, FIG. 10 shows the integration of an ATL.DLL in the processing operation of the Transformer Host Application, FIG. 11 shows an event data record and an Event Collect data record in the form of tables, FIG. 12 shows a subject stimulus aggregate and a stimulus aggregate data record in tabular form, FIG. 13 shows a schematic diagram and an exemplary application of the PEG editor, FIG. 14 shows a schematic diagram and an exemplary application of the PEG editor, FIG. 15 shows a schematic diagram of parameterization of so-called items and FIG. 16 shows a schematic diagram of parameterization of so-called groups.

FIG. 1 shows a schematic block diagram in conjunction with a test project in the field of market research. In a phase of data collection 10, so-called raw data 11 representing the stimulus response of the test subject are detected as part of the test project. The raw data is detected in a test environment in accordance with a previously defined test project definition. Raw data may be detected for example, as part of the so-called "eye tracking" which is used to detect whether the eye of the test subject is directed at individual or multiple stimulus elements of the test project. Another possibility of raw data acquisition that may be utilized consists of compiling entries made by the test subject via an input device on a computer, for example, a mouse or a keypad. The raw data 11 is filed according to the diagram in FIG. 1 in a database 12. The raw data detected as part of the test project may be supplemented by external data 13.

In the next step of the test project, the raw data are transferred to an analysis module 14 with which the raw data are analyzed in accordance with a predefined analysis strategy and are converted into metrics data 15. The analysis module 14 is implemented with the help of a software-based technology and ensures automatic data analysis of the raw data 11. The metrics data 15 are filed in an assigned database 16. The metrics data 15 may then be sent to a data presentation 17, which serves to present the result of the test project for market research.

Technologies in combination with the computer-assisted generation of the software-based analysis module 14 for analysis of the raw data 11 are described below.

FIG. 2 shows a schematic block diagram of a software-based analysis module 14 which comprises four main components in the embodiment presented here; these embodiments are explained in greater detail below.

An ATG editor 20 (ATG="Analysis Transform Graph") makes it possible for the user to define and manage a calculation logic for the test project to be conducted. FIG. 3 shows a schematic block diagram of additional details in combination with the ATG editor 20.

The definition of the calculation logic for the analysis phase of the test project is made separately from the source code of the software in a graphic data transformation language developed specifically for this purpose. To design a calculation logic, the user 30 accesses a selection of predefined transformation modules 31 which are presented to the user in the ATG editor 20. The predefined transformation modules are arranged in a graphic layout and are interconnected to form a transformation graph 32. The user can define the transformation graph 32 in a project-specific manner by means of his entries. Finally, the transformation graph 32 is stored in an XML-based format as ATG file 33. The "Method Definition Layer" with the ATG editor 20 answers the question: "With which logic should the calculation be performed?"

The ATG file 33 is a model of the computation logic. FIG. 4 illustrates the translation and use of the ATG model. The ATG file 33 is first translated into C# source text with the help of a generator model 40 of the analysis transform layer.

In the next step the source text is compiled in a .NET assembly, namely ATL.DLL 41 ("Analysis Transform Lib").

FIG. 5 shows a schematic block diagram of the ATG editor 20 which is composed of three elements: module box 50, canvas 51 and macro canvases bar 52. The element module box 50 offers the user a selection of data transformation modules which are defined in the analysis.transforms.DLL. The user can drag the modules into the canvas area 51 by drag and drop and assemble them into a transform graph. The transform graph of a canvas can be saved as an ATG module and displayed in the macro canvases bar 52 element. The ATG modules may be used as an element in another analysis transform graph and thus reused. In this way, simple and standardized basic elements may form the basis for more extensive and more specific data reports.

To ensure the comparability of a metrics data report over various test projects, the calculation logic of the report is usually defined as a standard and is used with no change in as many studies as possible extending over multiple projects.

The following advantages can be defined for the ATG editor 20:
 free definition of the analysis logic by the user.
 more effective definition of the analysis logic with the help of a specialized data transformation language.
 better comprehensibility and documentation of the analysis logic through graphic layout.
 the analysis logic may be managed, exchanged and distributed independently of the source code of the software.
 protection of confidential proprietary methods.

A PEG editor 21 in FIG. 2 allows the creation of the central project configuration format for the test project. FIG. 6 shows a schematic block diagram of additional details in combination with the PEG editor 21.

Project entities 60 are defined in their hierarchical structure to one another so that a project entity graph (PEG) 62 of the project is formed in the PEG editor 21 in accordance with the specifications of the user 61, and then a PEG file 63 is derived from this. The PEG file 63 is a comprehensive hierarchical description of the test project and of the stimulus investigated. The PEG file 63 is stored in an XML-based format. The "Project Definition Layer" with the PEG editor 21 answers the question: "With which entities should the calculation be performed?"

As part of the creation of the analysis module, the user has an opportunity to set a number of calculation parameters, which is done in the so-called APV editor 22. FIG. 7 shows a schematic block diagram of additional details in combination with the APV editor 22, and the ATG file 33 generated by means of the ATG editor 20 and the PEG file 63 created by means of the PEG editor 21 are also shown.

The compilation of the computation parameters is derived from the description of the object of investigation (PEG file 63), i.e., the hierarchical structure of the project entities, and the calculation logic that was used (ATG file 33), both of which were detected in a user-defined manner by means of the assigned editors, namely the PEG editor 21 and the ATG editor 20. The analysis parameter file 70 which was generated and is also referred to as the API file is loaded into the APV editor 22. The user 71 may then fill out the calculation parameters by means of the APV editor 22 and save the values thereby entered as APV file 73. The "Parameter Setup Layer" answers the question: "With which settings should the calculation be performed?"

The basic idea of the APV editor 22 is to make available to the user an interface tailored to the project design and the selected method definition. To do so the transform graph (ATG file 33) is searched for the parameter modules defined in it. The resulting parameter lists contain the following metadata for each parameter which can be stored by the creator of the ATG file 33: recommendations (value ranges that are customary), constraints (restrictions for values that are not relevant, warnings when standard-relevant settings are violated), commentaries, priority (parameters may be declared to be mandatory, optional or advanced), control type (a parameter is represented by the default control of its data type as the standard; for example, a checkbox for a Boolean value; in deviation other control types can also be defined), tags for filters, grouping, sorting and/or references to general help function.

In the next step, the parameter lists thereby obtained are transferred to the entities of the test design as defined in the PEG file 63 (cf. FIG. 6) and of the stimulus. As a result of this combination an analysis parameter items file (API file 70, cf. FIG. 7) is created, representing a structure of calculation parameters and the respective metadata.

API file 70 is loaded into the APV editor 22. The API file 70 is the basis for the dynamic task-adapted user interface functions of the APV editor 22 (cf. FIG. 7). The user interface of the APV editor 22 is subdivided into two regions: a PEG viewer region 75 and the parameter explorer region 76. The parameter explorer presents a list of user controls (user control list) to the user for the parameter list defined in the API file 70. The user control list of the parameter explorer may be filtered, grouped and sorted according to metadata stored in the API file 70, for example, as follows: alphabetical sorting of the controls, grouping according to task areas or filters of optional controls or controls that are used.

Each user control indicates the meta information saved by the creator of the ATG file 70, for example: recommendations (the usual value ranges), constraints (restrictions for values that are not relevant, warnings when violating standard-relevant settings), commentaries and/or references to general help function (see above).

Parameter settings may be based on certain project entities (for example, a task or a screen group) in the APV editor 22. The selected setting (for example, a cutoff value for a transition calculation). The setting is then valid for the entities subordinate to the project entity at the same time. The parameter may optionally be specified at a lower level of the PEG and thus the global setting may be overwritten. This facilitates manual definition of a plurality of detail settings.

The PEG viewer area in the user interface of the APV editor 22 uses the known editors and operating principles of the PEG editor 21. The PEG viewer area allows the user to select calculation parameters according to how they belong to the various project entities.

In conjunction with the proposed APV editor 22, this yields multiple advantages with regard to usability. Thus only the parameters required for the specific calculation are displayed. Specific recommendations, constraints and commentaries by the author of the calculation methods are displayed. All the operating elements are filtered and sorted according to their priority and tags assigned to them.

Finally, according to FIG. 2, a so-called Transformer Host Application 23 serves the purpose of actually performing the calculation. To do so, first the configuration files ATG file 33, APV file 73 and PEG file 63 generated in the three previous layers are loaded. With the help of the calculation logic defined previously in the ATG editor 20, the description of the project entities generated in the PEG editor 21 and the user-specific calculation settings generated in the APV editor 22, a metrics data record (result data) is calculated from the raw data detected for the test project.

As shown in the diagram, the phase of the method described here in the Transformer Host Application 23 depends on the entries in the previous phases in the project definition layer, the method definition layer and the parameter setup layer. The phase for parameter setting depends on the previously detected entries in the parameter setup layer and the method definition layer. The phases in the parameter setup layer and the method definition layer are completely independent of all the other phases.

The data exchange among the four component, the ATG editor 20, PEG editor 21, APV editor 22 and Transformer Host Application 23, takes place by way of four defined interfaces: "Analysis Transform Graph" (ATG.XML), "Project Entities Graph" (PEG.XML), "Analysis Parameter Items" (API.XML) and "Analysis Parameter Values" (APV.XML). The data exchange via the interfaces takes place in the form of XML files. All the formats are defined as XML schemes (XSD) (XSD is a standard developed by the World-Wide-Web Consortium to describe XML documents (http://www.w3.org/TR/xmlscheme-1/-29November2009)). The four central interfaces in an open format that conforms to the industrial standard make it possible for various users to integrate the four main components into their systems independently.

The abovementioned properties, namely the use of discrete layers, the use of strictly defined interfaces between the layers and the development of limited dependencies between the layers permit distributed hosting of the four main components on different physical units (tiers). The data exchange takes place via web services, which transfer the XML files illustrated under interfaces.

The multilayer architecture implements in an especially effective manner advantageous software design principles: "Encapsulation," "Cohesion," "Separation of Concerns" and "Loose Coupling." Consequently the advantages described for these principles come into play here: easier maintenance, improved expandability and better testability.

FIG. 8 shows a schematic block diagram of distributed hosting. The configuration editors ATG editor 20, PEG editor 21 and APV editor 22 may be retrieved on different personal computers as Web or Rich Client Applications (.NET XBap or Silverlight) via a webserver. The Transformer Host Application 23 is hosted on a high-performance application server.

This yields many advantages. The division into four discrete layers (ATG editor 20, PEG editor 21, APV editor 22 and Transformer Host Application 23) permits operation of the modules with the help of the open interface formats and also independently of one another via additional import and export functions. The modules can easily be integrated later into an expanded overall system. The ATG editor 20 and the PEG editor 21 in particular are modules that can be integrated into an existing system to supplement or upgrade its functionality. Alternatively, individual modules may make available a partial functionality of the overall system in advance as a stand-alone delivery.

The multilayer architecture also has the advantage of incremental migration from an existing system. This possibility is of interest in particular for users who must continue to operate the parts of the functionality of their old system for a certain period of time for reasons of compatibility or warranty.

These four modules each offer a generic functionality:
ATG editor 20—definition of calculation logic PEG editor 21—definition of a stimulus and of an experimental design APV editor 22—editing and managing parameters Transformer Host Application 23—performing a calculation, which can also be used independently of their special integration in software-based systems.

Because of the great independence of the layers among one another, specialized development teams can be formed. The communication complexity among the teams can be minimized.

Hardware resources can be allocated to performance-intensive requirements in a targeted manner. If needed, a computation power many times greater than the customary power can be used by specifically making use of a Cloud Computing System. For example, the usual PC performance used may be 50 times greater and therefore calculation times can be greatly reduced while at the same time hardware maintenance and acquisitions costs can be reduced. Expensive desktop systems can be configured specifically by request and used as needed.

Project participants can perform the various phases of a project work from different locations independently of one another: definition of calculation logic, definition of a stimulus and of an experimental design and editing and management of parameters. It is also possible that multiple project participants can process a project phase simultaneously. For example, the creation of the project definition and the stimulus definition (PEG file 63) may be performed by multiple employees at the same time using different PCs. Production time for labor-intensive project phases can thus be greatly reduced through greater use of personnel.

The Transformer Host Application 23 is responsible for the actual performance of processing the raw data. To do so, the configuration files generated in the three preceding layers, namely ATG file 33 and PEG file 63 are used. FIG. 9 shows a schematic diagram of the use of the Transformer Host Application 23. The definition of the calculation logic (ATG) is compiled in a current ATL.DLL 90 before each data processing. The calculation logic (ATG file 33) is available to the Transformer Host Application 23 within the context of the analysis module generated, i.e., as executable byte code (ATL.DLL), which the logic then uses for data processing. The Transformer Host Application 23 processes raw data 91 which are obtained in a test environment 82 with this test subject 83 to yield metrics data 92. The metrics data 92 can be represented in a presentation 80. The presentation 80 may then be presented to users 81, for example, to the party ordering the analysis (cf. FIG. 8).

FIG. 10 shows the integration of the ATL.DLL in the processing operation of the Transformer Host Application 23. The Transformer Host Application 23 is typically hosted on a high-performance application server (optionally through cloud computing). Communication with the modules APV editor 22, CAP.Conduction Scheduler 100 and CAP.Presentation 101 takes place via the event interfaces represented in FIG. 10. The CAP.Conduction Scheduler 100 has the task of controlling the test sequence and the data acquisition. Depending on the specification in the project data (PEG), the CAP.Conduction Scheduler 100 supplies the statement of problem, for example, in the starting position for the test function (for example, a URL) to the test subject. After conclusion of the processing of a task, the CAP.Conduction Scheduler 100 informs the Transformer Host Application 23 via a new raw data record and thus triggers calculation steps in the Transformer Host Application 23. The calculation steps within the Transformer Host Application 23 are controlled with the help of the Processing Scheduler component. After processing a calculation step, the Processing Scheduler component informs the data visualization and reporting layer of the system which then renews its presentation while including the newly calculated metrics data.

The event system which goes beyond layers and tiers is implemented in the form of web services.

An incremental calculation step of the Transformer Host Application 23 begins with receiving the CAP.Conduction event 100 and ends with the sending of the CAP.Presentation update event 101. The calculation process described below is performed in two seconds at most in practice.

The CAP.Conduction Event 100 transfer a PEG reference 102 of a stimulus unit 103 (typically a screen) which has thus been concluded in the ongoing test project. A Processing Scheduler 103 then acquires the PEG definition of the screen from the PEG file 63 of the project. In the next step, the calculation parameter values from the APV file 73 are loaded. The resulting parameter data record is transferred to a collect module 104. The collect module 104 transfers the input parameter set to the input interface of the ATL.DLL. The collect module 104 expects a so-called subject stimulus aggregate data record 105 as a result of the calculation in the ATL (cf. FIG. 12).

A so-called Input Factory 106 triggers the loading of the raw data record 91, which has just been generated in the test project of the screen for which the calculation is to be performed into the calculation logic of the ATL. The calculation module of the ATL transforms the raw data from the Event Data Format first to the Event Collect Format, for example, with the help of the Visit Module 107 (cf. FIG. 10).

FIG. 11 shows the Event Data Format and the Event Collect Format in tabular form. Next, with the help of an aggregate module, an aggregation of the Event Collect data to the metrics data defined in the ATG file 33 is performed. The resulting Subject Stimulus Aggregate data record (cf. FIG. 12) is returned to the collect module. The Subject Stimulus Aggregate data record has only a minimal data volume in comparison with the Event Date data (cf. FIG. 11). The data record is stored temporarily in binary form in the Persist Data memory module.

In the next working step, a Stimulus Aggregate Module is used in order to aggregate the Subject Stimulus Aggregate data record to yield a Stimulus Aggregate data record. The Subject Stimulus Aggregate and the Stimulus Aggregate data records are shown in tabular form in FIG. 12.

In the next step, the metrics values aggregated for the stimulus unit are stored in the database for Result Data. After conclusion of the calculation, the update event is sent to CAP.Analysis. The active report client then loads the updated data values. The metrics data for the observation of a screen just concluded in the test project are thus available in updated form in the data report.

The Processing Scheduler documents the calculation steps that have been performed in a so-called track memory module. By temporarily saving the fine-membered elements of the PEG file 63 and of the stacked calculation phases (Event Data, Event Collect, Subject Stimulus Aggregate and Stimulus Aggregate), a complete recalculation of the data is only rarely necessary even after a change in settings in the AVP module.

The PEG editor 21 will be explained further below.

PEG editor 21 permits the creation of the central project configuration format, namely the PEG file 63 of a project. The PEG file 63 is a comprehensive hierarchical description of the test design and of the stimulus to be investigated.

FIGS. 13 and 14 show the schematic design and an exemplary application case of the PEG editor 21.

The user interface of the PEG editor 21 is subdivided into three separate editors which are visible simultaneously to the user and make it possible for the user to create and process the project entity graphs. A tree view editor 130 shows the hierarchical structure of the project entity graphs. The user has the option to add, delete or copy node points (nodes) by using drag and drop and context menu functions. A node editor 131 shows the property parameters of the node point currently selected and enables their processing. A canvas editor 132 shows the spatial arrangement of the defined stimulus nodes (items and groups) and enables their processing.

The Project Entity Scheme (PES) is the definition of the PEG file format. To implement the development goals that have been set, such as integration of all project configurations of the various project phases in a common format, applicability to complex study designs, standardization of the project definition and comparability over various media, the Project Entity Scheme is designed as a comprehensive descriptive language (taxonomy) for test designs and media). The basic concept of the PES is the arrangement of all elements involved in a project definition (project entities) in a hierarchical graph and parameterizing them uniformly. To achieve a standardization over the various application cases, project entities are defined in the form of seven abstract classes: "Subject," "Task," "Setting," "ScreenGroup," "Screen," "Item-Group" and "Item."

The following section gives definitions and examples for these seven classes. The section after that shows a uniform parameterization scheme for all the project entity classes.

A "Subject" is an acting individual.

A "Task" is an induced (even self-induced) disposition which has effects on a subject over an investigation period of time (task). A task (such as the item) influences the action by the test subject. The task period of time is clearly limited by a starting event ("Task Start") and an ending event ("Task End"). The Task End event is often bound to an action by a test subject. The Task Start event may be bound to an action by a test subject. The task period of time is experienced by the test subject as a sequence of screens.

During the screen period of time, a subject experiences a collection of items. Examples include: a person reads a new entry on a shopping list ("Task Start") or a test subject purchases a product at amazon.com ("Task End").

A group of "Items" (over all tasks and screens) which are to be compared with a group of other (disjunct) items. A systematic variation in the properties of items whose effect on the test subject is to be investigated. The items of a setting should never act on the test subject simultaneously (within a screen—or even better, within a task) with the items of another setting.

A "Screen Group" is a "Group" whose children (items or groups) are offered to the test subject as an alternative. A "Screen Group" may be assigned to a Conduction Presenter.

A modal detail in the perception of the test subject. A group of items that have a modal effect on the test subject. No (peripheral) perception of items in other screens is possible. During the screening period of time, a "Subject" experiences a collection of items, for example, a web page, a magazine double page or a TV clip (in subdividing time-based media, the duration of the auditory and visual buffer in the human perception must be taken into account—individual successive images in a video are not modal to one another (in the perception of the test subject).).

An "Item Group" is a "Group" whose children (items or groups) are offered to the test subject at the same time. "Item Groups" may implement a functional structure of items (menu, wrap panel, slide panel, etc.). Their effect on items is thus perceptible (visible).

An "Item" is an element of the stimulus which has an effect on the test subject. An item may contain a hyperlink that calls up a new screen or a ScreenGroup in the Conduction Presenter.

To parameterize the seven PES classes uniformly, they are divided into two groups: "Items" (PES class item), "Groups" (by definition all additional PES classes) and special groups (setting and task class).

FIGS. 15 and 16 show schematic diagrams of parameterization of items and groups.

The PEG scheme permits a hierarchical declaration of the stimulus element. Instances of stimulus elements and features may be characterized with the aid of groups or of the tag property. On the basis of PEG definitions, extensive segmentations of the stimulus (horizontally and vertically) may be performed. In cooperation with the ATG definition, references between tracking data levels and the defined stimulus elements are established.

For example, several levels may be differentiated for stimulus elements in a test project "Point of Sale":
Level 1:
To investigate urban shopping behavior with the help of GPS tracking, the stimulus elements to be investigated can be defined with the help of the PEG editor 21, using as the contents of the canvas editor a city map of the region under investigation.
Level 2:
For investigating the customer movement within a retail passage or a shopping center, an inspection window, loading inputs and the guide system are defined in the PEG editor 21.
Level 3:
Within a market, the different departments and the control system of the market are defined in the PEG editor 21.
Level 4:
Within an aisle of shelving, ceiling-mount hangers, standup displays and shelf dividers are defined.
Level 5:
Additional subgroups can be defined for each shelving unit: shelving segment (bay), segment level (base), product group (SKU group) and product (SKU).
Level 6:
For each product the packaging elements for the different spatial views can be defined.

The features of the invention disclosed in the description above, the claims and the drawings may be important either individually or in any combination for the implementation of the invention in its various embodiments.

The invention claimed is:
1. A computer-assisted method for generating a software-based analysis module for analysis of electronic raw data representing a detected stimulus response of a human test subject in a test project in market research, wherein the method comprises the following steps, which are performed in a computer unit:
supplying logic data representing a user-defined calculation logic in an application software implemented on the computer unit,
supplying project data representing a user-defined project definition with a structured arrangement of project entities of the test project in market research, in the application software, generating project setup parameter data by assigning the user-defined calculation logic to the project entities in allocating the logic data to the project data and deriving from this project setup parameters for the project entities of the test project in market research, supplying the project setup parameter data for a data output via a user interface and compiling the assigned user entries for at least some of the project setup parameter data, and generating an analysis module according to the logic data, the project data and the project setup parameter data, which is configured to receive electronic raw data representing a detected stimulus response of a human test subject in a test project in market research and to process said raw data to analyze the response of the human test subject.

2. The method according to claim 1, wherein the logic data and/or the project data are supplied in accordance with a graphic representation.

3. The method according to claim 1 wherein generating the analysis module comprises converting the logic data into source text data and supplying the project setup parameters with the respective project setup parameter values.

4. The method according to claim 1, wherein the logic data, the project data and/or the project setup parameter data are supplied in an XML-based data format.

5. The method according to claim 1,
wherein generating product setup parameter data comprises:
deriving setup parameter data from the logic data by investigating the logic data according to parameters comprised by them, and
assigning the setup parameter data to the project entities of the test project in market research in the project data.

6. The method according to claim 1, wherein the logic data are supplied first as editable output logic data, and user entries based thereon are detected by means of an assigned editor and used for editing the output logic data.

7. The method according to claim 6, wherein predefined calculation logic modules that can be selected by the user are supplied with the editor which is assigned to the logic data.

8. The method according to claim 1, wherein the project data are supplied first as editable output project data and user entries based thereon, with which the project data are edited, are detected by means of an assigned editor.

9. The method according to claim 8, wherein the editor which is assigned to the project data is supplied with one or more subeditors, the subeditors comprising:
a tree editor configured to display a hierarchical structure of the structured order of the project entities and to detect user entries based thereon,
a node editor configured to display property parameters of a currently selected mode of the structured order of the project entities and to detect user entries based thereon, and
a canvas editor configured to display a spatial arrangement of nodes of the structured order of the project entities and to detect user entries based thereon.

10. The method according to claim 1 wherein the project setup parameter data for project setup parameters represented thereby each comprise metadata, which in turn comprise at least one type of data selected from the following groups of types of data:
value range recommendation data,
value range restriction data,
commentary data,
priority data,
control type data,
grouping data, filtering data and/or sorting data and
reference data for reference to help functions.

11. The method according to claim 1, wherein the analysis module is configured to generate metrics data representing the response of the human test subject in processing the raw data.

12. The method according to claim 1, wherein the raw data is detected by eye tracking comprising detecting whether an eye of the human test subject is directed to an individual or at multiple stimulus elements of the test project in market research.

13. The method according to claim 1, further comprises supplying the project data separately from the logic data.

* * * * *